United States Patent
Yip et al.

(10) Patent No.: US 9,518,489 B1
(45) Date of Patent: Dec. 13, 2016

(54) GAS TREATMENT SYSTEM FOR VEHICLE

(71) Applicants: Hing Kau Yip, Hong Kong (HK); Sze chung jon Yip, Hong Kong (HK)

(72) Inventors: Hing Kau Yip, Hong Kong (HK); Sze chung jon Yip, Hong Kong (HK)

( * ) Notice: Subject to any disclaimer, the term of this patent is extended or adjusted under 35 U.S.C. 154(b) by 0 days.

(21) Appl. No.: 14/737,535

(22) Filed: Jun. 12, 2015

(51) Int. Cl.
  *F01N 3/08* (2006.01)
  *F01N 3/01* (2006.01)
  *F01N 3/00* (2006.01)

(52) U.S. Cl.
  CPC ............ *F01N 3/0892* (2013.01); *F01N 3/005* (2013.01); *F01N 3/01* (2013.01); *F01N 3/0807* (2013.01)

(58) Field of Classification Search
  CPC ........ F01N 3/01; F01N 3/0807; F01N 3/0892; F01N 2240/38
  See application file for complete search history.

(56) References Cited

U.S. PATENT DOCUMENTS 2,267,066 A * 12/1941 Wolf .................. B60K 5/08
                                                  180/69.6
5,758,495 A *  6/1998 Serra ................. B01D 53/326
                                                    60/275

FOREIGN PATENT DOCUMENTS

| GB | 1346998 A | * | 2/1974 | ............. B60K 11/08 |
| KR | 2001004820 A | * | 1/2001 | |
| TW | EP 2453114 A1 | * | 5/2012 | ............. F01N 3/029 |

* cited by examiner

*Primary Examiner* — Audrey K Bradley

(57) ABSTRACT

A gas treatment system for a vehicle contains: a gas charging unit, a gas exhausting unit, and a tail gas treating unit. The gas charging unit includes a plurality of air inlets arranged on a roof and a peripheral side of the vehicle and communicating with a body of the vehicle, the plurality of air inlets also connect with an air inlet channel for charging fresh air. The gas exhausting unit includes a gas discharge channel for discharging waste gas, and the gas discharge channel has an outlet segment arranged on an upper side thereof and extending out of a top surface of a tail end of the vehicle. The tail gas treating unit includes an electrode absorber disposed on a lower end of the outlet segment of the gas discharge channel to treat the waste gas from the gas discharge channel.

8 Claims, 10 Drawing Sheets

GAS TREATMENT SYSTEM FOR VEHICLE

FIELD OF THE INVENTION

The present invention relates to a gas treatment system for a vehicle which is capable of overcoming the shortcomings of the conventional gas treatment system for the vehicle.

BACKGROUND OF THE INVENTION

A conventional gas treatment system for a vehicle contains a gas charging unit and a gas exhausting unit. However, when an air inflow is not sufficient, gasoline cannot be burned completely to cause waste gas in which carbon powders, hydrocarbon, carbon monoxide, or water vapor, and nitrogen oxides exit.

To overcome such a problem, a gas treatment system has been developed to purify waste gas by using ammonia water, but the ammonia water is poisonous and corrosive.

The present invention has arisen to mitigate and/or obviate the afore-described disadvantages.

SUMMARY OF THE INVENTION

The primary objective of the present invention is to provide a gas treatment system for a vehicle which is capable of overcoming the shortcomings of the conventional gas treatment system for the vehicle.

To obtain above-mentioned objective, a gas treatment system for a vehicle provided by the present invention contains: a gas charging unit, a gas exhausting unit, and a tail gas treating unit.

The gas charging unit includes a plurality of air inlets arranged on a roof and a peripheral side of the vehicle and communicating with a body of the vehicle, the plurality of air inlets also connect with an air inlet channel for charging fresh air.

The gas exhausting unit includes a gas discharge channel for discharging waste gas, and the gas discharge channel has an outlet segment arranged on an upper side thereof and extending out of a top surface of a tail end of the vehicle.

The tail gas treating unit includes an electrode absorber disposed on a lower end of the outlet segment of the gas discharge channel to treat the waste gas from the gas discharge channel.

A rectangular waterproof cover is supported on the roof of the vehicle above the plurality of air inlets by plural holding stands, and a stop plate is fixed between the waterproof cover and the roof of the vehicle to stop rainwater flowing into the plurality of air inlets.

The air inlet channel is rigid and has a curved portion connected with a flexible hose.

The waterproof cover includes a support rack, a cap, and a connector, wherein the support rack is a square tube or is in a L shape, and the support rack is made of stainless steel; the cap is coupled with the connector by ways of at least one screw, and a lower portion of the connector is joined with a horizontal frame of the roof of the vehicle, the cap has a first watertight line formed in a U shape and arranged on each of two sides thereof, and the air inlet channel also has a second watertight line formed in an L shape and disposed on an upper end thereof, each air inlet has a flat bottom or a tilted bottom.

The gas discharge channel also has a silencer fixed on an intermediate section thereof and has at least one curved portion, and a bending angle of each curved portion of the gas discharge channel is 45 to 90 degrees, wherein a number of the at least one curved portion is 2.5 to 3.

The roof of the vehicle includes plural oval vents arranged proximate to the outlet segment of the gas discharge channel, the roof also includes a water isolation plate formed in an inverted V shape and mounted in front of the plural oval vents to stop rainwater flowing into the vehicle and to facilitate heat dissipation.

The gas charging unit further includes an air inflow segment formed on a bottom surface of the tail end of the vehicle in front of the engine, and the air inflow segment has an arcuate wind deflector.

Two air guiding portions are arranged in a middle section of the tail end of the vehicle, and each air guiding portion has at least one wind wire, and a cross section of the least one wind wire is in any one of a L shape, a T shape, a square shape, a triangle shape, a circle shape, and a semicircle shape.

The outlet segment of the gas discharge channel has a rainwater shield rotatably connected thereon.

The electrode absorber of the tail gas treating unit has a negative oxygen ion generator and a collection tray disposed on the tail end of the vehicle by using a support mount and located below the outlet segment of the gas discharge channel, such that the negative oxygen ion generator sprays negative oxygen ion to neutralize the waste gas.

The collection tray is integrally molded from flame retardant plastic or stainless steel and has a locking slot defined on a bottom thereof to retain with the support mount, and the collection tray has water and a sponge accommodated therein.

Thereby, the gas treatment system has advantages as follows:

1. The gas discharge channel discharges tail gas out of the vehicle, and then the tail gas is scattered by exterior air brilliantly.

2. A heat source of the vehicle is away from an engine of the vehicle to lower a temperature of the engine.

3. A number of the at least one curved portion of the gas discharge channel is 2.5 to 3, and the bending angle of each curved portion is 45 to 90 degrees, thus discharging the tail gas smoothly.

4. A length of the gas discharge channel is at least 50% less than a conventional gas discharge channel to decrease vehicle weight and fuel consumption.

5. The silencer is fixed on the intermediate section of the gas discharge channel to reduce noises.

6. The roof of the vehicle includes plural oval vents arranged proximate to the outlet segment of the gas discharge channel, the roof also includes a water isolation plate formed in an inverted V shape and mounted in front of the plural oval vents to stop rainwater flowing into the vehicle and to facilitate heat dissipation greatly.

DETAILED DESCRIPTION OF THE PREFERRED EMBODIMENTS

Figure 1:
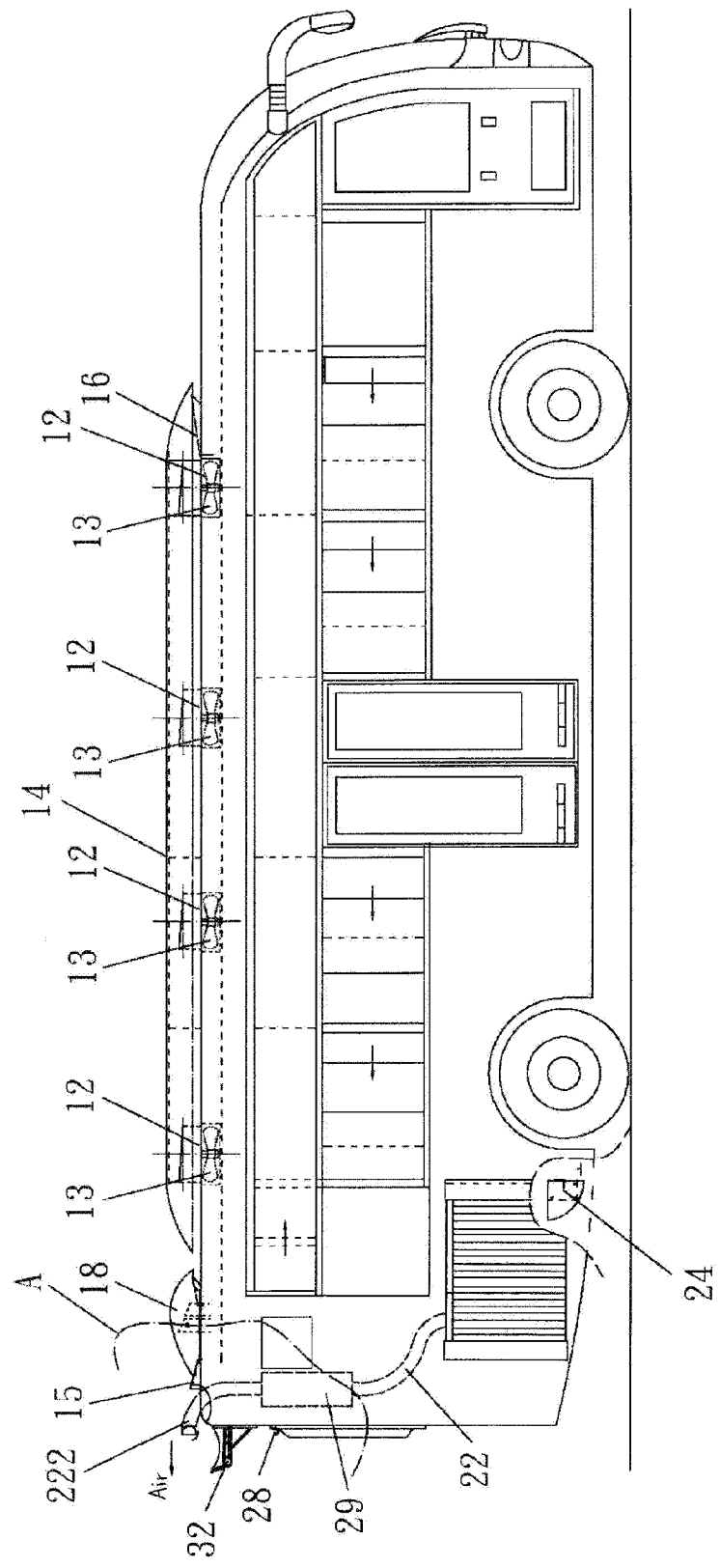
FIG. 1 is a side plane view showing the assembly of a gas treatment system for a vehicle according to a preferred embodiment of the present invention.

With reference to FIGS. 1 to 7, a gas treatment system for a vehicle according to a preferred embodiment of the present invention comprises: a gas charging unit, a gas exhausting unit, and a tail gas treating unit.

The gas charging unit includes a plurality of air inlets 12 arranged on a roof and a peripheral side of the vehicle and communicating with a body of the vehicle, the plurality of air inlets 12 also connect with an air inlet channel 122 for charging fresh air. The gas exhausting unit includes a gas discharge channel 22 for discharging waste gas, and the gas discharge channel 22 has an outlet segment 222 arranged on an upper side thereof and extending out of a top surface of a tail end of the vehicle. The tail gas treating unit includes an electrode absorber disposed on a lower end of the outlet segment 222 of the gas discharge channel 22 to treat the waste gas from the gas discharge channel 22.

A rectangular waterproof cover 14 is supported on the roof of the vehicle above the plurality of air inlets 12 by plural holding stands, and a stop plate 16 is fixed between the waterproof cover 14 and the roof of the vehicle to stop rainwater flowing into the plurality of air inlets 12. The waterproof cover 14 has a tilted wing and plural intakes which are arranged on a peripheral side of the waterproof cover 14, a streamline piece disposed on a rear portion thereof to reduce wind resistance, and plural outlets formed on a tail end thereof to flow air. Preferably, the streamline piece of the waterproof cover 14 is made of plastic material or fiber-reinforced plastic (FRP).

The air inlet channel 122 is smooth and rigid, and the air inlet channel 122 has a curved portion connected with a flexible hose, such that a flow resistance in the air inlet channel 122 is reduced, the air inlet channel 122 is cleaned easily and is durable. Preferably, the curved portion of the air inlet channel 122 is in connection with a flexible hose to obtain shockproof purpose.

The waterproof cover 14 includes a support rack 144, a cap 146, and a connector (not shown), wherein the support rack 144 is a square tube or is in a L shape, and the support rack 144 is made of stainless steel; the cap 146 is coupled with the connector (not shown) by ways of at least one screw, and a lower portion of the connector is joined with a horizontal frame of the roof of the vehicle, the cap 144 has a first watertight line 142 formed in a U shape and arranged on each of two sides thereof, and the air inlet channel 122 also has a second watertight line 124 formed in an L shape and disposed on an upper end thereof, each air inlet 12 has a flat bottom or a tilted bottom to achieve waterproof purpose, reduce wind resistance, and to be cleaned easily. The gas charging unit further includes plural electric fans 13, wherein four electric fans 13 are arranged on each vehicle (50 W/each electric fan=200 W) to circulate air in each vehicle, and they are turned on/off by a driver. Thereby, the four electric fans 13 are arranged on each vehicle to circulate air efficiently.

Referring to FIGS. 4A to 4D, the gas charging unit further includes two circulation wings 18 mounted on two sides of a rear end of the roof to guide air into the plurality of air inlets 12 and the body of the vehicle.

The gas discharge channel 22 also has a silencer 29 fixed on an intermediate section thereof and has at least one curved portion, and a bending angle of each curved portion of the gas discharge channel 22 is 45 to 90 degrees, wherein a number of the at least one curved portion is 2.5 to 3.

Thereby, the gas discharge channel 22 has advantages as follows:

1. The gas discharge channel 22 discharges tail gas out of the vehicle, and then the tail gas is scattered by exterior air brilliantly.

2. A heat source of the vehicle is away from an engine of the vehicle to lower a temperature of the engine.

3. A number of the at least one curved portion of the gas discharge channel 22 is 2.5 to 3, and the bending angle of each curved portion is 45 to 90 degrees, thus discharging the tail gas smoothly.

4. A length of the gas discharge channel 22 is at least 50% less than a conventional gas discharge channel 22 to decrease vehicle weight and fuel consumption.

5. The silencer 29 is fixed on the intermediate section of the gas discharge channel 22 to reduce noises.

Figure 2:
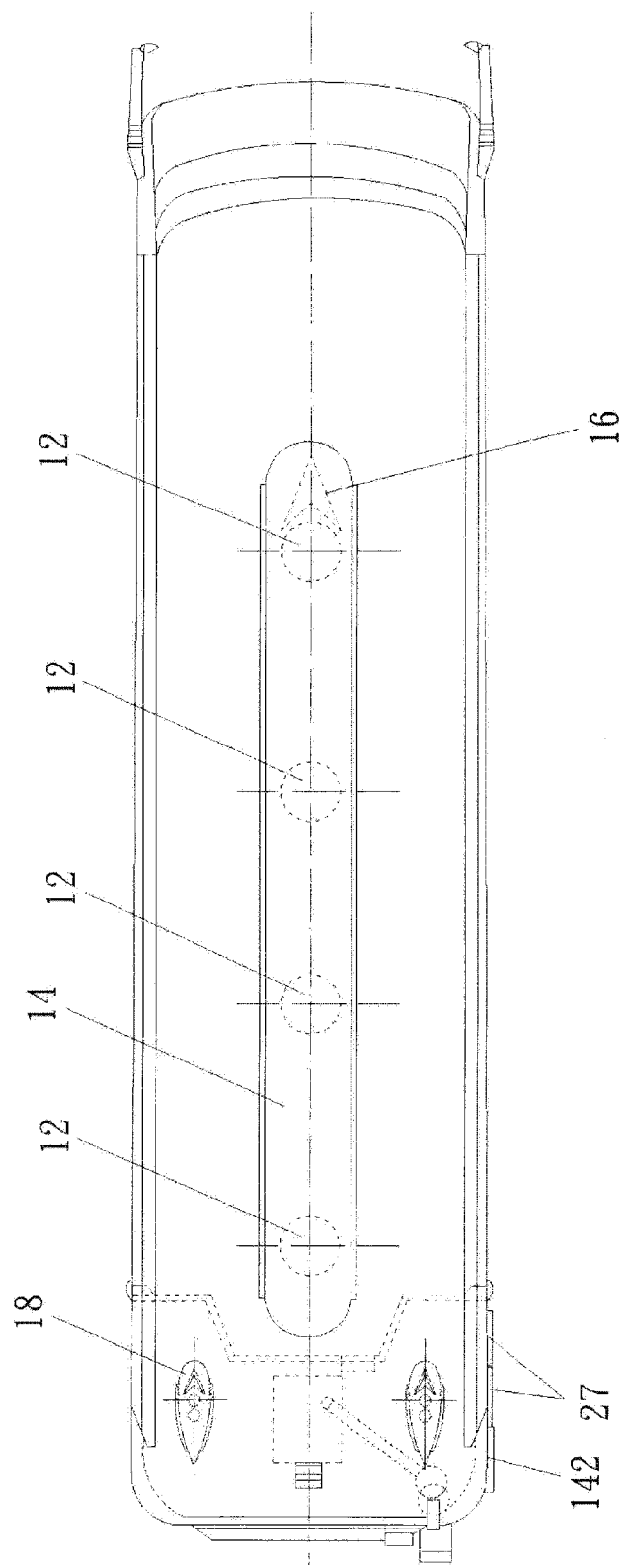
FIG. 2 is a top plane view showing the assembly of the gas treatment system for the vehicle according to the preferred embodiment of the present invention.

As shown in FIG. 2, the roof of the vehicle includes plural oval vents (not shown) arranged proximate to the outlet segment 222 of the gas discharge channel 22 to dissipate heat. In addition, the roof also includes a water isolation plate 15 formed in an inverted V shape and mounted in front of the plural oval vents to stop the rainwater flowing into the vehicle and to facilitate heat dissipation. The tail end of the vehicle has a plurality of air apertures 26 and a tail plate which are located below the outlet segment 222 of the gas discharge channel 22, thus obtaining heat dissipation and easy maintenance. Preferably, a U-shaped waterproof line 28 is configured on the tail end of the vehicle above the plurality of air apertures 26 to shield rainwater.

Figure 9:
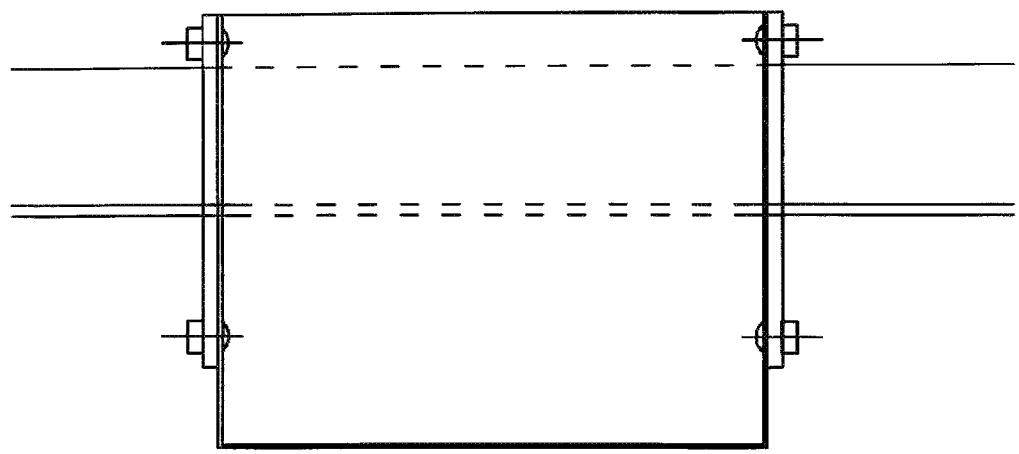
FIG. 9 is another side plane view showing the assembly of a part of the gas treatment system for the vehicle according to the preferred embodiment of the present invention.
Figure 10:
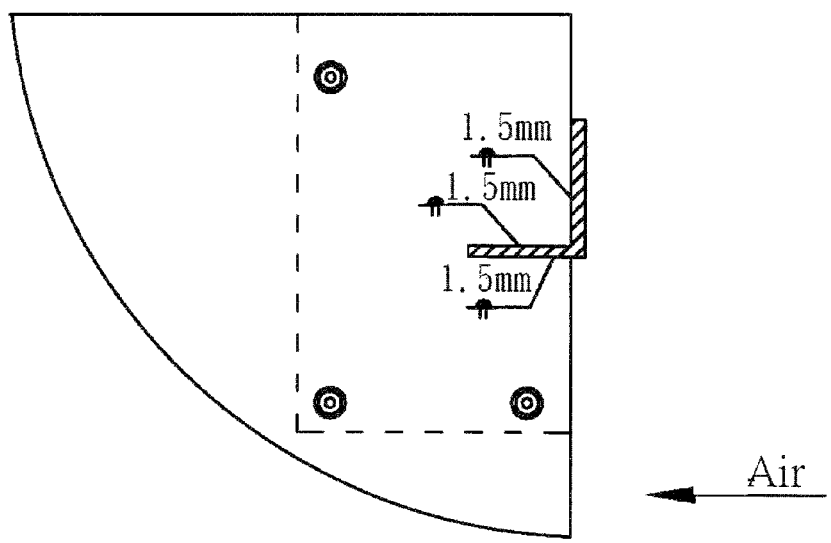
FIG. 10 is a cross sectional view showing the assembly of a part of the gas treatment system for the vehicle according to the preferred embodiment of the present invention.

As illustrated in FIGS. 1 and 9, the gas charging unit further includes an air inflow segment formed on a bottom surface of the tail end of the vehicle in front of the engine, wherein the air inflow segment has an arcuate wind deflector 24 to guide airflow into an engine room of the vehicle, wherein a length of the wind deflector 24 is equal to ¼ of arc of 40 cm diameter (i.e., 31.40 cm), and a width of the wind deflector 24 is 25 cm, the wind deflector 24 is 8 cm lower than a horizontal beam of the vehicle in front of the engine. Furthermore, the wind deflector 24 is made of plastic material and had two reinforcement ribs secured on two sides thereof. The wind deflector 24 is fixed on the air inflow segment of the gas charging unit by using screws to decrease a temperature of the engine room.

The outlet segment 222 of the gas discharge channel 22 has a rainwater shield 224 formed in an inverted V shape and rotatably connected thereon, wherein the rainwater shield 224 partially covers the outlet segment 222 to discharge the gas still. Thereby, the outlet segment 222 of the gas discharge channel 22 allows stopping rainwater, increasing gas exhaustion, and enhancing collection of carbon substances in the tail gas.

Figure 11:
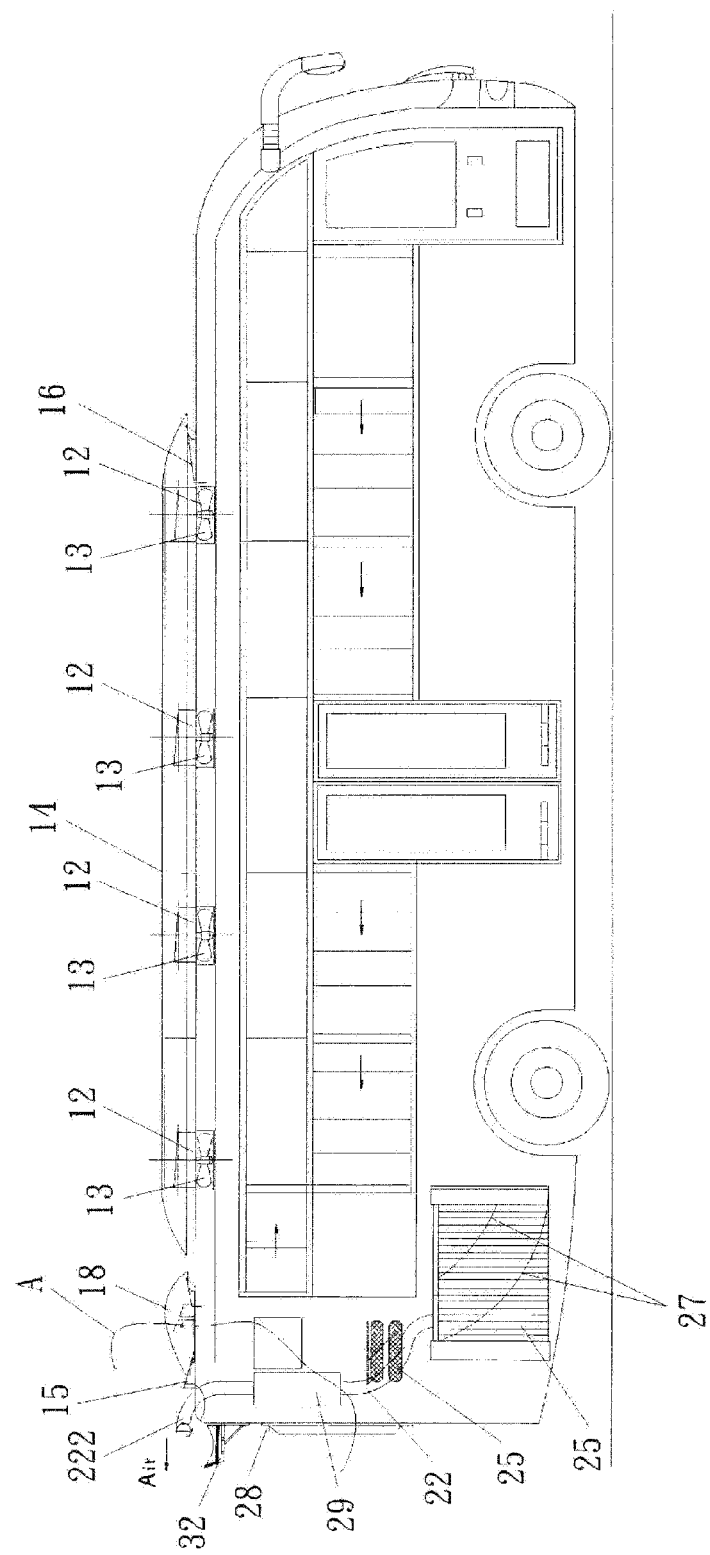
FIG. 11 is a side plane view showing the assembly of a gas treatment system for a vehicle according to another preferred embodiment of the present invention.
Figure 12:
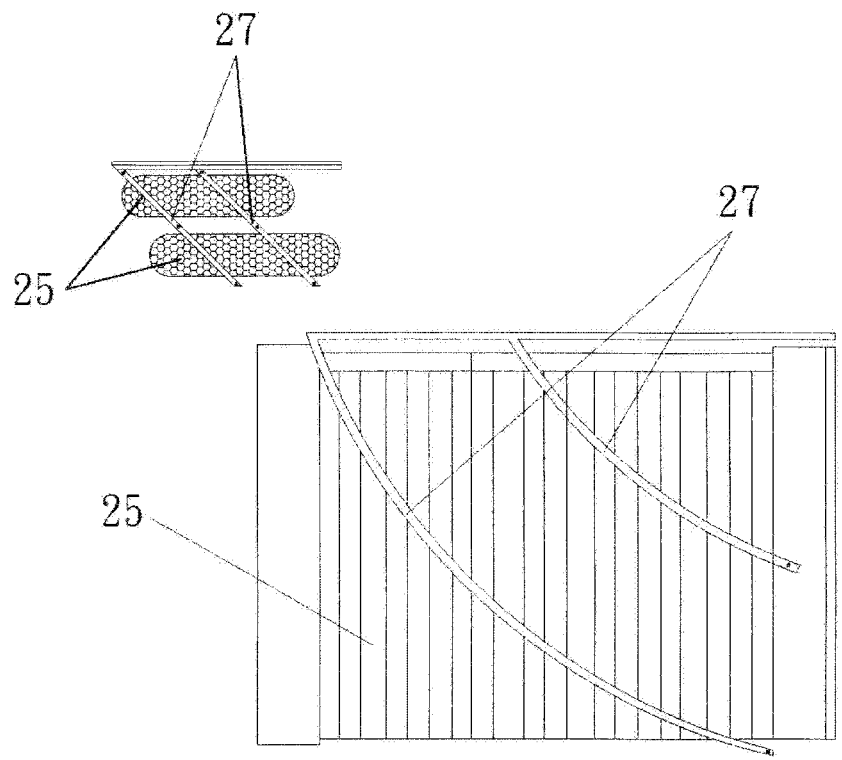
FIG. 12 is a side plane view showing the assembly of a part of the gas treatment system for the vehicle according to another preferred embodiment of the present invention.

With reference to FIGS. 11 and 12, two air guiding portions 25 are arranged in a middle section of the tail end of the vehicle, and each air guiding portion 25 has at least one wind wire 27, a third watertight line is formed in a U shape and is located above the air guiding portion 25, wherein the at least one wind wire 27 extends 2 cm out of the body of the vehicle, such that more than 50% airflow flows into the air guiding portion 25 as driving the vehicle, thus flowing fresh air. The least one wind wire 27 vertically or obliquely extends out of the body of the vehicle, and a cross section of the least one wind wire 27 is in any one of a L shape, a T shape, a square shape, a triangle shape, a circle shape, and a semicircle shape.

Figure 3:
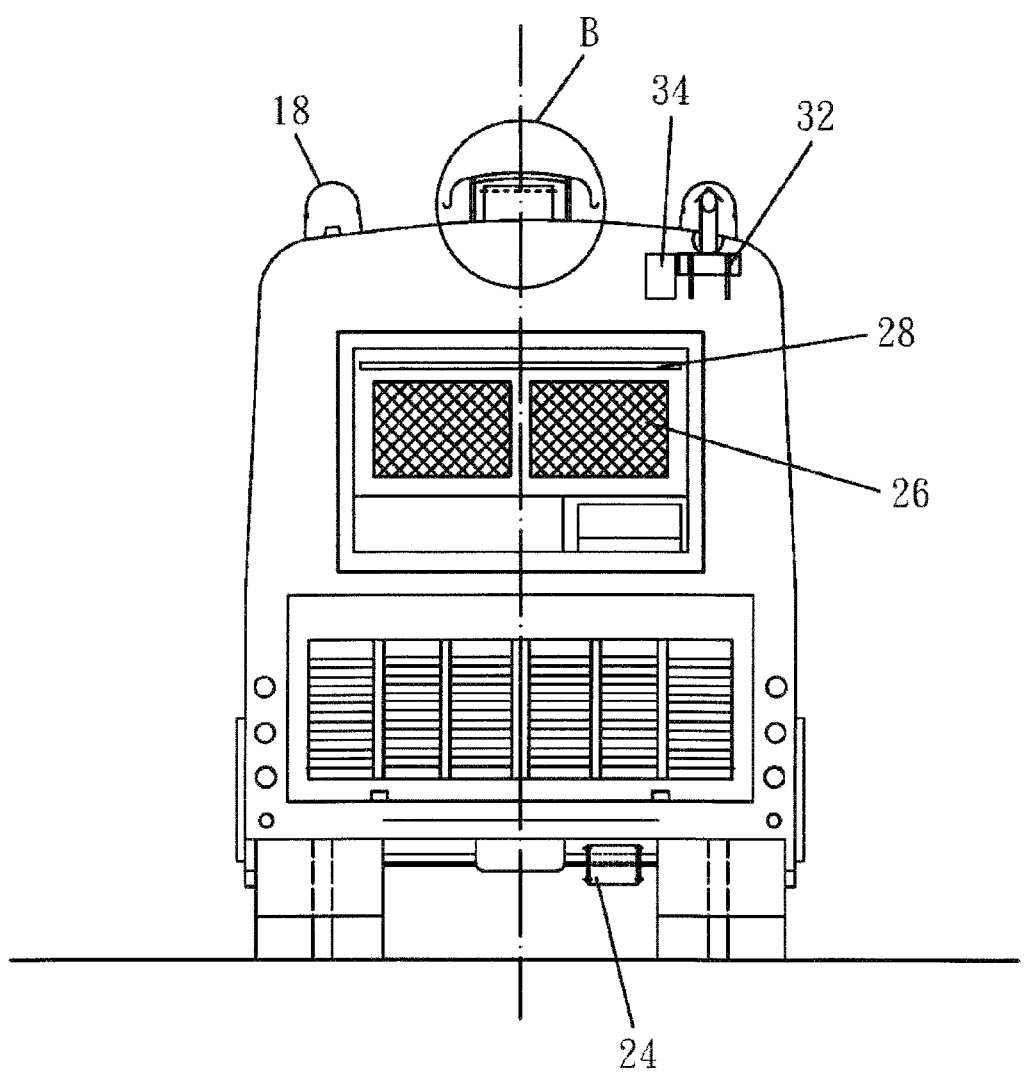
FIG. 3 is a rear plane view showing the assembly of the gas treatment system for the vehicle according to the preferred embodiment of the present invention.
Figure 4A:
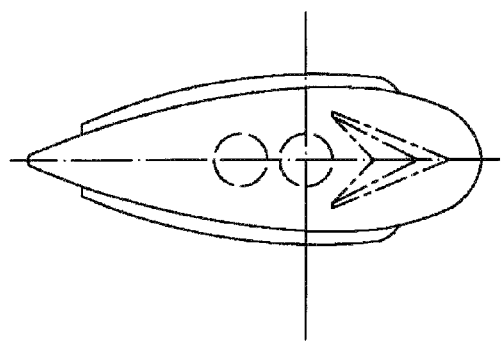
FIG. 4A to 4D are a top plane view showing the assembly of a part of the gas treatment system for the vehicle according to the preferred embodiment of the present invention.
Figure 4B:
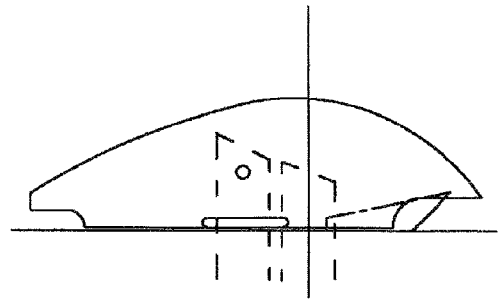
Figure 4C:
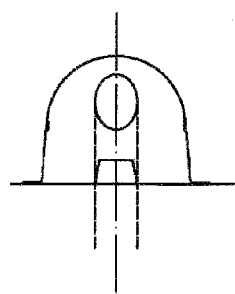
Figure 4D:
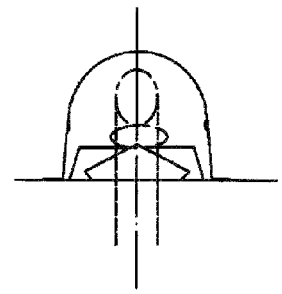
Figure 5:
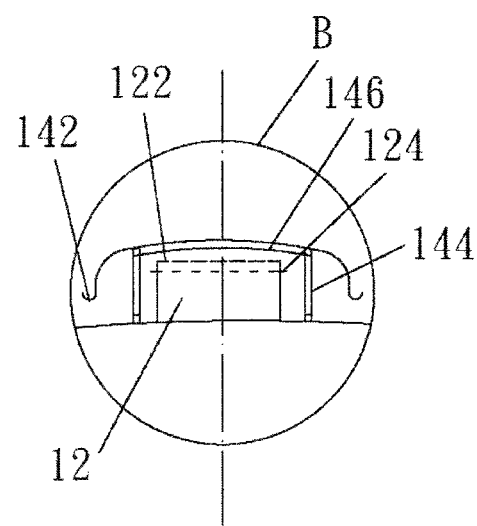
FIG. 5 is an amplified view of a portion B of FIG. 3.
Figure 6:
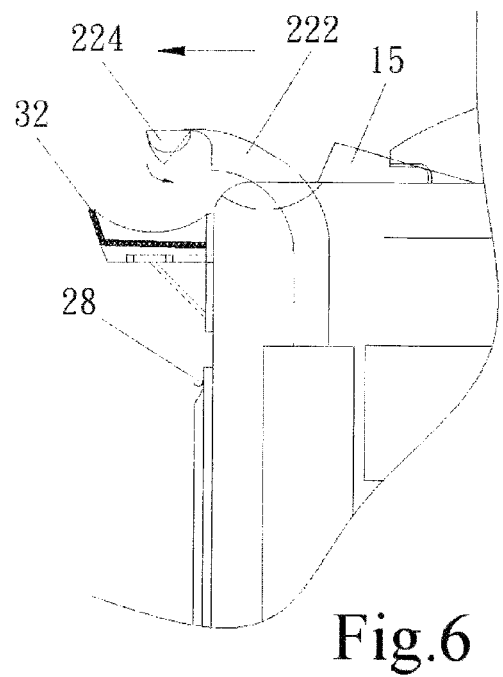
FIG. 6 is an amplified view of a portion A of FIG. 1.
Figure 7:
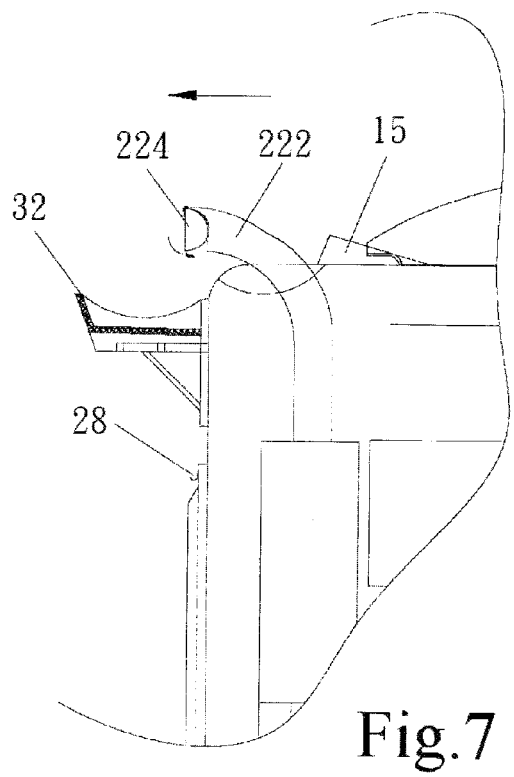
FIG. 7 is another amplified view of the portion A of FIG. 1.
Figure 8:
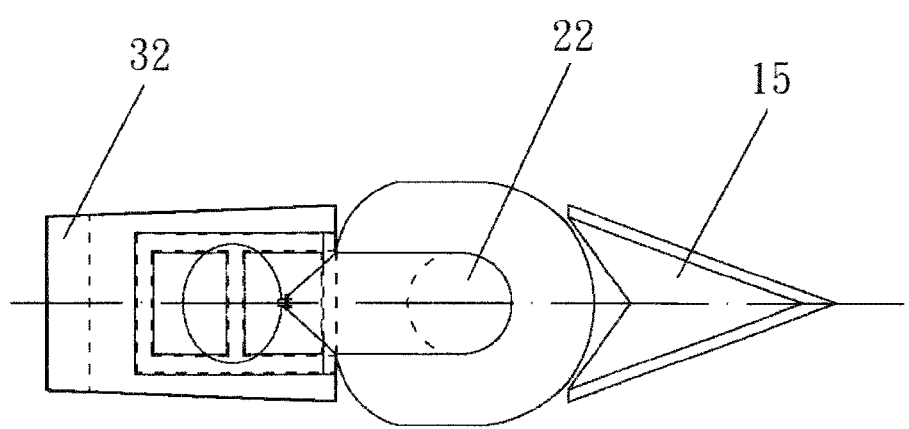
FIG. 8 is a side plane view showing the assembly of a part of the gas treatment system for the vehicle according to the preferred embodiment of the present invention.

Referring to FIGS. 1, 3 and 8, the electrode absorber of the tail gas treating unit has a negative oxygen ion generator 34 and a collection tray 32 disposed on the tail end of the vehicle by using a support mount and located below the outlet segment 222 of the gas discharge channel 22, such that the negative oxygen ion generator 34 sprays negative oxygen ion to neutralize the waste gas. The collection tray 32 is integrally molded from flame retardant plastic or stainless steel and has a locking slot defined on a bottom thereof to retain with the support mount, thus facilitating connection and removal. Accordingly, the negative oxygen ion generator 34 sprays negative oxygen ion to neutralize smokes and dusts in the waste gas at PM 0.1 to 10. Thereafter, smokes and dusts fall on the collection tray or the ground to be attached by water and a sponge in the collection tray 32.

Thereby, the electrode absorber of the tail gas treating unit is simplified and is fixed easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A gas treatment system for a vehicle comprising: a gas charging unit, a gas exhausting unit, and a tail gas treating unit:

wherein the gas charging unit includes a plurality of air inlets arranged on a roof and a peripheral side of the vehicle and communicating with a body of the vehicle, the plurality of air inlets also connect with an air inlet channel for charging fresh air;

wherein the gas exhausting unit includes a gas discharge channel for discharging waste gas, and the gas discharge channel has an outlet segment arranged on an upper side thereof and extending out of a top surface of a tail end of the vehicle;

wherein the tail gas treating unit includes a negative oxygen ion generator disposed on a lower end of the outlet segment of the gas discharge channel to treat the waste gas from the gas discharge channel;

wherein the roof includes a water isolation plate formed in an inverted V shape so as to stop rainwater flowing into the vehicle and to facilitate heat dissipation;

wherein the outlet segment of the gas discharge channel has a rainwater shield rotatably connected thereon; and wherein the negative oxygen ion generator of the tail gas treating unit has a collection tray disposed on the tail end of the vehicle by using a support mount and located below the outlet segment of the gas discharge channel, such that the negative oxygen ion generator sprays negative oxygen ion to neutralize the waste gas.

2. The gas treatment system for the vehicle as claimed in claim 1, wherein the gas discharge channel also has a silencer fixed on an intermediate section thereof and has at least one curved portion, and a bending angle of each curved portion of the gas discharge channel is 45 to 90 degrees, wherein a number of the at least one curved portion is 2.

3. The gas treatment system for the vehicle as claimed in claim 1, wherein the gas charging unit further includes an air inflow segment formed on a bottom surface of the tail end of the vehicle in front of an engine, and the air inflow segment has an arcuate wind deflector.

4. The gas treatment system for the vehicle as claimed in claim 1, wherein the gas exhausting unit further includes two air guiding portions arranged in a middle section of the tail end of the vehicle, and each air guiding portion has at least one wind wire, and a cross section of the least one wind wire is in any one of an L shape, a T shape, a square shape, a triangle shape, a circle shape, and a semicircle shape.

5. The gas treatment system for the vehicle as claimed in claim 1, wherein the collection tray is integrally molded from flame retardant plastic or stainless steel and has a locking slot defined on a bottom thereof to retain with the support mount, and the collection tray has water and a sponge accommodated therein.

6. The gas treatment system for the vehicle as claimed in claim 1, wherein the gas charging unit includes a rectangular waterproof cover supported on the roof of the vehicle above the plurality of air inlets by plural holding stands, and the gas charging unit also includes a stop plate fixed between the waterproof cover and the roof of the vehicle so as to stop rainwater flowing into the plurality of air inlets.

7. The gas treatment system for the vehicle as claimed in claim 6, wherein the air inlet channel is rigid.

8. The gas treatment system for the vehicle as claimed in claim 7, wherein the waterproof cover includes a support rack and a cap, wherein the support rack is a square tube or is in an L shape, and the support rack is made of stainless steel; the cap has a first watertight line formed in a U shape and arranged on each of two sides thereof, and the air inlet channel also has a second watertight line formed in an L shape and disposed on an upper end thereof, each air inlet has a flat bottom or a tilted bottom.

* * * * *